(No Model.)
G. W. & A. J. DOORE.
COW TAIL HOLDER.
No. 429,849. Patented June 10, 1890.
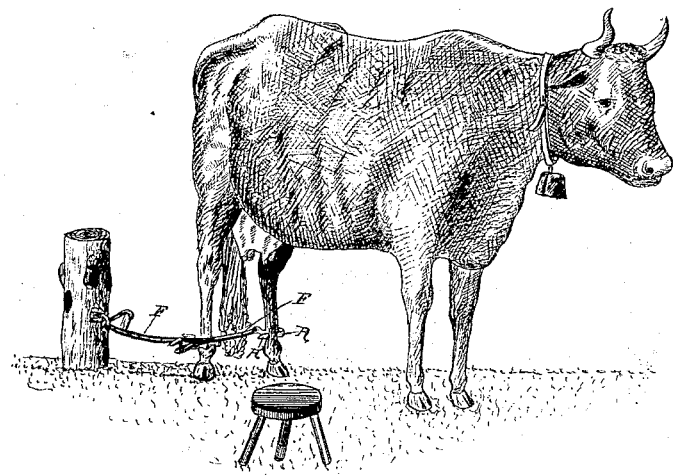
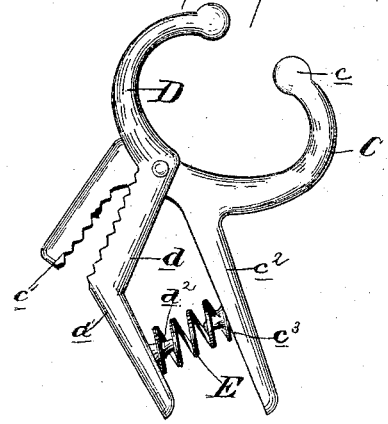
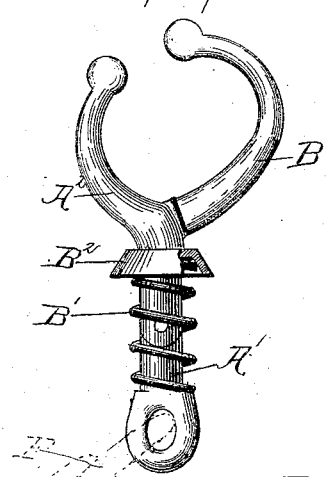
Witnesses
Fred R. Cornwall
Charles F. Mallard
Inventors
Geo Washington Doore
Alfan Joel Doore
per Stoddart & Co.
Attorneys

UNITED STATES PATENT OFFICE.

GEORGE WASHINGTON DOORE AND ALLAN JOEL DOORE, OF GREENE, IOWA.

COW-TAIL HOLDER.

SPECIFICATION forming part of Letters Patent No. 429,849, dated June 10, 1890.

Application filed July 27, 1889. Serial No. 318,845. (No model.)

*To all whom it may concern:*

Be it known that we, GEORGE WASHINGTON DOORE and ALLAN JOEL DOORE, citizens of the United States, residing at Greene, in the county of Butler and State of Iowa, have invented new and useful improvements in a device which will effectually prevent milch-cows from kicking, and switching their tails, while being milked, of which the following is a specification.

Our invention relates to an improvement in animal-stocks; and it consists in the construction and arrangement of the parts thereof, which will be more fully hereinafter described and claimed.

The object of our invention is to provide a device which will effectually prevent milch-cows from kicking, and switching their tails, while being milked. We attain this object by the construction illustrated in the accompanying drawings, wherein like letters of reference indicate corresponding parts in the several views, and in which—

Figure 1 is a perspective view of the device attached to a cow. Fig. 2 is a detail view of the tail-holder, and Fig. 3 is a detail view of the cord-clip.

In the drawings, A represents the cord-clip, having an extended curved arm B and a straight shank A', with an eye at its lower end. The upper portion of the shank is cut away and has the shank of the short arm $A^2$ pivoted thereon. The two shanks at this point form a cylinder corresponding to the circumference of the lower end of the shank A'. Around the shank is placed a spiral spring B', its lower end resting against a shoulder on shank A', and its upper end secured in the depressed under side of the concaved collar $B^2$, surrounding the shank and movably held in place thereon. By depressing the spring and forcing the collar below the jointed portion of the two shanks the arm $A^2$ may be swung back to permit the clip to be placed on the leg of the cow. The construction of arm B, as shown, brings the greater part of the strain directly thereon to avoid the danger of the clip spreading.

In Fig. 2 we have shown the clip or tail-holder adapted to be placed on the opposite leg. It consists of two pivoted jaws C and D, the first having a curved gripping end $c$ and a serrated shank $c'$ extending out at right angles.

$c^2$ represents an arm extending out from the jaw C, between the shank and end $c$, and is provided with a lateral tooth $c^3$.

The jaw D has a serrated shank $d$, the teeth of which mesh with the teeth of shank $c'$. The lower end of this shank has an arm $d'$, extending out therefrom parallel with arm $c^2$, and has a tooth $d^2$ thereon. To normally hold the serrated edges of the shank and the outer ends of the jaws in proximity to each other, we place a spiral spring E on the teeth between the arms $c^2$ and $d'$. By depressing the same the said parts are forced apart.

F represents a rope or cord secured to the eye in the shank of clip A. This cord, to be in operative position, is first passed in front of the opposite leg and back over the clip C, and its end is made fast to a stationary object. The end of the tail of the animal is then placed between the jaws over the rope, thereby preventing the rope from slipping off from the clip, and also holding the tail to prevent the cow from switching it. The cord, passing in front of the leg, prevents the forward movement of the same. It will thus be seen that by the above construction and arrangement a very simple and convenient device is formed which will effectively avoid great annoyance in milking.

We are aware that many minor changes may be made in the construction and arrangement of the parts of our device and substituted for those shown and described without in the least departing from the nature and principle of our invention.

Having thus fully described our invention, what we claim, and desire to secure by Letters Patent of the United States, is—

In a device of the kind described, a tail-holding clip consisting of two curved jaws C and D, serrated shanks on the jaws extending out at right angles therefrom and parallel with each other, an inclined arm $c^2$, extending out from the jaw C intermediate the shank and the end of the jaw, an arm $d'$, extending out at an incline from the end of the shank on jaw D, teeth on the arms directly opposite each, and a spiral spring between the arms on the teeth, substantially as described.

In testimony whereof we affix our signatures in presence of two witnesses.

GEORGE WASHINGTON DOORE.
   ALLAN JOEL DOORE.

Witnesses to the signature of George Washington Doore:
 F. A. BISBEE,
 LOWELL H. JONES.

Witnesses to the signature of Allan Joel Doore:
 RODOLPHE YOUNG,
 OSCAR C. PERRIN.